United States Patent
Ariyavisitakul et al.

(10) Patent No.: US 6,473,393 B1
(45) Date of Patent: Oct. 29, 2002

(54) CHANNEL ESTIMATION FOR OFDM SYSTEMS WITH TRANSMITTER DIVERSITY

(75) Inventors: Siritiat Lek Ariyavisitakul, Alpharetta, GA (US); Ye Li, Atlantic Highlands, NJ (US); Nambirajan Seshadri, Chathan, NJ (US); Vahid Tarokh, Hackensack, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/215,074

(22) Filed: Dec. 18, 1998

(51) Int. Cl.[7] .............................. H04J 11/00; H04B 1/10
(52) U.S. Cl. ........................................ 370/203; 375/349
(58) Field of Search .................................. 370/206, 208, 370/210, 515, 203, 207, 514; 375/347, 348, 349, 267; 455/508, 65

(56) References Cited

U.S. PATENT DOCUMENTS

| | | | |
|---|---|---|---|
| 5,528,581 A | * | 6/1996 | De Bot ........................ 370/203 |
| 5,774,450 A | * | 6/1998 | Harada et al. ............... 370/206 |
| 5,867,478 A | * | 2/1999 | Baum et al. ................. 370/203 |
| 6,052,594 A | * | 4/2000 | Chuang et al. .............. 370/330 |

* cited by examiner

Primary Examiner—Wellington Chin
Assistant Examiner—William Schultz

(57) ABSTRACT

In a receiver that includes a plurality of receiving antennas that supply signals to associated OFDM receiving modules, and the receiving modules provide signals that are applied to a detector, channel parameters that are needed for proper detection are estimated during normal operation, in addition to an initial estimate based on a known training sequence. In computing the channel impulse response estimates between the signal received at that receiving antenna and the various transmitting antennas, an $nK_0 \times nK_0$ matrix of terms ($q_{xy}[l]$) is developed. The inverse of the matrix is then computed, and the computed matrix inverse is multiplied by a vector of terms ($p_i[l]$), to obtain a vector of $nK_0$-sample channel impulse response estimates.

9 Claims, 2 Drawing Sheets

US 6,473,393 B1

CHANNEL ESTIMATION FOR OFDM SYSTEMS WITH TRANSMITTER DIVERSITY

REFERENCE TO RELATED APPLICATIONS

This application is related to an application titled "Diversity Coded OFDM For High Data Pe Commuxication," which was filed on Dec. 17, 1998 and assigned to the assignee of this application, bearing the Ser. No. 09/213,585.

BACKGROUND OF THE INVENTION

This invention relates to OFDM systems and, more particularly, to channel parameter estimation in OFDM systems that employ transmitter diversity.

In orthogonal frequency division multiplexing (OFDM) the channel is divided into many narrow subbands, which are transmitted in parallel, thereby, increasing the symbol duration and reducing or eliminating the intersymbol interference (ISI) caused by the dispersive Rayleigh fading environment. On the other hand, since the dispersive property of wireless channels causes frequency selective fading, there is higher error probability for those subbands with deep fading. Hence, techniques such as error correction code and diversity have to be used to compensate for the frequency selective fading of wireless channels. In this report, we investigate transmitter diversity using space-time codes for OFDM systems.

Recently, space-time coding has been developed for high data-rate wireless communications, and such coding has been extended to OFDM systems in a U.S. patent application titled "Orthogonal Designs and Transmit Diversity for Wireless Communications," filed on Nov. 6, 1998 and bearing the Ser. No. 09/186,908. The space-time code is characterized by high code efficiency and good performance; hence, it is a promising technique to improve the efficiency and performance of OFDM systems. However, decoding of the space-time code requires the channel state information, which is a task that must be performed and, therefore, the efficiency with which the task is carried out is an issue.

Channel parameter estimation has been successfully used to improve performance of OFDM systems. For systems without co-channel interference, with estimated channel parameters, coherent demodulation is allowed, instead of differential demodulation, to achieve a 3–4 dB signal-to-noise ratio (SNR) gain. Moreover, for systems with receiver diversity, the maximum-ratio diversity combiner (MR-DC), which is equivalent to the minimum-mean-square-error diversity combiner (MMSE-DC) in this case, can be obtained using estimated channel parameters. For systems with co-channel interference, the coefficients for the MMSE-DC can be calculated from estimated channel parameters and instantaneous correlation of the signals from each receiver. However, no teachings can be found on the parameter estimation for OFDM systems with transmitter diversity.

SUMMARY

Enhanced performance is obtained by estimating channel parameters during normal operation, in addition to an initial estimate based on a known training sequence, through use of the detected signals. Once the OFDM-modulated signals that are transmitted by the various transmitting antennas are detected, the signal received at a receiving antenna is employed to compute channel impulse response estimates between the signal received at that receiving antenna and the various transmitting antennas. The process is repeated for each receiving antenna.

In computing the channel impulse response estimates between the signal received at that receiving antenna and the various transmitting antennas, an $nK_0 \times nK_0$ matrix of terms ($q_{xy}[l]$) is developed. Then, the inverse of the matrix is computed, and the computed matrix inverse is multiplied by a vector of terms ($p_i[l]$), to obtain a vector of $nK_0$-sample channel impulse response estimates. Each $q_{xy}[l]$ term is evaluated by selecting a signal sent by transmitting antenna x (i.e., $b_x[k]$, where k is an index designating a frequency subband of the OFDM transmitter), multiplying it by the conjugated signal of transmitting antenna y, i.e., $b_y[k]$, further multiplying it by $$e^{\left(-j\frac{2\pi kl}{K}\right)},$$

and summing over all of the frequency subbands; all for impulse response sample time l. K is the number of frequency subbands. The $p_i[l]$ term corresponds to $$\sum_{k=1}^{K} r[k] b_i^*[k] e^{\left(-j\frac{2\pi kl}{K}\right)}$$

where r[k] is the signal of the receiving antenna.

DETAILED DESCRIPTION

Figure 1:
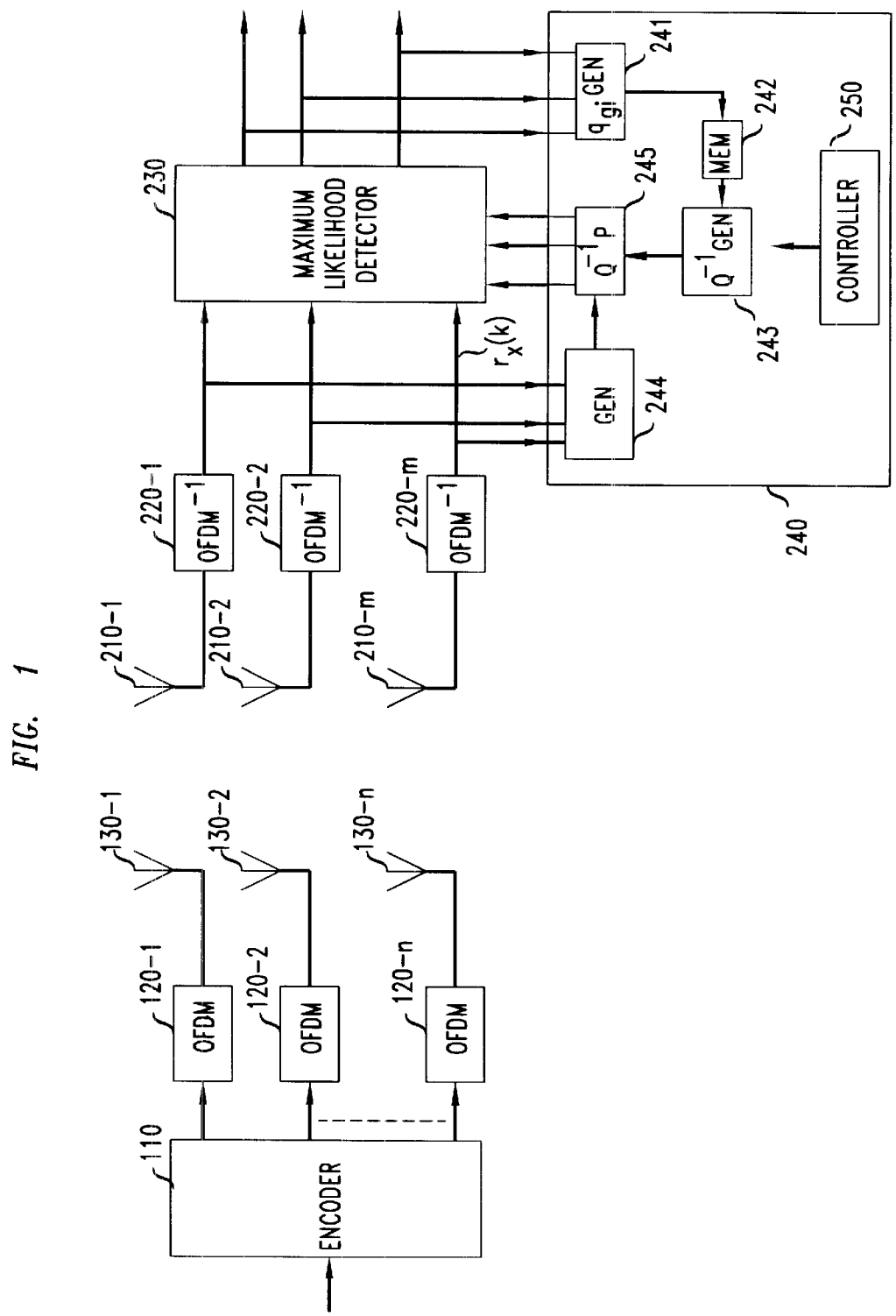
FIG. 1 presents a block diagram circuitry for estimating channel response in accordance with the principles disclosed herein.

An OFDM system with transmitter diversity using the spacetime code is shown in FIG. 1. At each time t, a data block is encoded by encoder 110 to develop n blocks of symbols, and these blocks of symbols are applied to OFDM transmitters 120-i, and thence to transmitting antenna 130-i. At the receiver the transmitted signals are detected by antennas 210-j, and applied to OFDM receivers 220-j, where j=1, 2, . . . m. The signal obtained at the output of OFDM receiver 220-j is $$r_j[k] = \sum_{i=1}^{n} H_{ij}[k] b_i[k] + w_j[k] \qquad (1)$$

where $r_j[k]$ is the signal received at antenna 210-j at frequency subband k, $b_i[k]$ is the is symbol transmitted by antenna 130-i at frequency subband k, $H_{ij}[k]$ is the channel transfer function between transmitting antenna 130-i and receiving antenna 210-j at frequency subband k, and $w_j[k]$ is the additive complex white Gaussian noise, with zero-mean and variance $\sigma^2$ received at antenna 210-j and is the same for all frequency subbands. The following analysis pertains to signals received at antenna j that were transmitted by transmitting antenna i. To simplify the notations, the subscripts j and i are omitted.

A channel that includes multi-paths can be described by an impulse time response of the form:

$$h(t) = \sum_p \gamma_p h_o(t - \tau_p), \quad (7)$$

where t is time, $\tau_p$ is the delay of multi-path p between an originating point and a terminating point, $\gamma_p$ is the corresponding complex amplitude flinction of time for multi-path p, and $h_o(t)$ is shaping pulse, which is usually a square-root raised-cosine. Hence, the frequency response at time t is $$H(f) \equiv \int_{-\infty}^{+\infty} h(t) e^{-j2\pi f \tau} dt \quad (8)$$
$$= H_0(f) \sum_p \gamma_p e^{-j2\pi f \tau_p},$$

where $$H_0(f) \equiv \int_{-\infty}^{+\infty} h(t) e^{-j2\pi f \tau} dt$$

is basically the channel's frequency response of the one path that has no delay (i.e., the principal, direct, path). It is sometimes called the channel's "shaping filter." We assume that the $\gamma_p$'s are wide-sense stationary (WSS), narrow-band complex Gaussian processes, which are independent for different paths.

The combined channel response, in the time domain, is the sum of the delayed replicas of $h_o(t)$ multiplied by the $\gamma_p$'s. In an OFDM system with K frequency subbands, one would want to have K samples of the channel's response over the time slot's time interval $T_s$ (recalling that the FFT is a K-to-K transformation). However, when the combined channel response of equation (7) is only rmax long, one needs to consider only $\lceil \tau_{max}/T_s \rceil$ samples (because the other ones are zero), and any integration (summation) to obtain the frequency response needs to be done only over $K_0$ samples, where $K_0 = \lceil \tau_{max}/T_s \rceil$. Hence the frequency response of the channel can be obtained from the following equation $$H[k] = \sum_{l=0}^{K_0-1} h[l] \exp\left(-j\frac{2\pi kl}{K}\right), \quad (9)$$

where h[1] corresponds to the combined, effective, channel impulse response, l is a time domain index, k is an index designating a subband, and K is the number of subbands employed in the OFDM system. H[k] in equation (9) actually corresponds to $H[k\Delta f]$, where $\Delta f$ is the bandwidth of a subband of the OFDM.

As indicated above, to decode space-time code used for the transmitter diversity of OFDM systems, channel parameters have to be provided. One can provide an initial estimate of the h[1] impulse responses by sending a known training sequence of samples, and evaluating the received signal.

In accordance with the principles disclosed herein, however, once the initial are obtained and normal operations begin, the impulse responses continue to be estimated based on the decisions made regarding the transmitted signals. Specifically, for a given set of received signals, $r_j[k]$, at the different receiving antennas, j, a decision is made regarding the transmitted signals $b_i[k]$ from each antenna i. Based on the decisions made regarding those transmitted signals, and given the actually received signals, a set of optimized impulse functions is computed and applied to subsequent reception decisions.

Thus, given that the decisions regarding the signals transmitted by transmitting antenna i are made correctly, the impulse responses can be computed by choosing a set, at each receiving antenna j, a set of impulse responses estimates, $\tilde{h}_{gj}[l]$, that minimize $$C(\{\tilde{h}[l]\}) = \sum_{k=1}^{K_0-1} \left| r_j[k] - \sum_{g=1}^{n} \sum_{l=0}^{K_0-1} \tilde{h}_{gj}[l] W[kl] b_g[k] \right|^2, \quad (10)$$

where $$W[kl] \equiv \exp\left(-j\frac{2\pi kl}{K}\right). \quad (11)$$

The minimum can be identified by taking the derivative of equation (10) with respect to each particular impulse function $\tilde{h}_{ij}[l_0]$ (i.e., of antenna i, at time $l_0$) and setting it to zero. This minimization is repeated $l_0$ times in connection with a given transmitting antenna, and n times for the n transmitting antennas.

It can be shown that taking the derivative of equation (10) with respect to $\tilde{h}_{ij}[l_0]$ and setting it to zero corresponds to $$0 = \sum_{k=1}^{K} W[-kl_o] b_i^*[k] \cdot \left( r_j[k] - \sum_{g=1}^{n} \sum_{l=0}^{K_0-1} \tilde{h}_{gj}[l] W[kl] b_g[k] \right), \quad (12)$$

and as mentioned above, this equation is repeated for i=1, 2, ... ,n and $l_0$=0, 1, ... , $K_0$-1. Equation (12) can be rewritten as:

$$\sum_{g=1}^{n} \sum_{l=0}^{K_0-1} q_{gi}[l_o - l] \tilde{h}_{gj}[l] = p_i[l_o], \quad (13)$$

where $$p_i[l_o] = \sum_{k=1}^{K} r[k] W[-kl_o] b_i^*[k] \text{ and} \quad (14)$$

$$q_{gi}[l_o] = \sum_{k=1}^{K} b_g[k] b_i^*[k] W[-kl_o]. \quad (15)$$

What equation (13) says is that the elements of $\tilde{h}_{gj}[l]$ that satisfy the equality are the elements that minimize the error signal $C(\{\tilde{h}[l]\})$ of equation (10). Of course, equation (13) has $K_0 \times n$ unknowns, corresponding to the $K_0$ elements of each $\tilde{h}_{gj}[l]$ in the n different $\tilde{h}_{gj}[l]$'s (from the n transmitting antennas). However, the differentiation that led to equation (13) is carried out $K_0 \times n$ times, as indicated above, providing the requisite number of equations to allow solving for the elements of the impulse function estimates.

Equation (13) can be rewritten as a sum of dot products $$\sum_{g=1}^{n} q_{gi}[l_0] \tilde{h}_{gj} = p_i[l_0] \quad (16)$$

where $$\tilde{h}_{gj} = (h_{gj}[0], h_{gj}[1], \ldots, h_{gj}[K_0-1])^T \text{ and} \quad (17)$$

$$q_{gi}[l_o] = (q_{gi}[l_o-0], q_{gi}[l_o-1], \ldots, q_{gi}[l_o-K_0+1]) \quad (18)$$

or as $$q_i[l_0]\bar{h}_j = p_i[l_0],\quad (19)$$

where $$q_i[l_0] = (q_{1i}[l_0]\ q_{2i}[l_0]\ \ldots\ q_{ni}[l_0]),\text{ and} \quad (20)$$

$$\bar{h}_j = (\bar{h}_{1j},\ \bar{h}_{1j},\ \ldots\ \bar{h}_{1j}) \quad (21)$$

Expressing equation (19) for each value of $l_0$ and then for each value of i, we get the expression $$Q\bar{h}_j = P \quad (22)$$

where P is a vector of n elements, $p_x$, where index x=1, 2, ... n, and $$p_x = (p_x[0]\ p_x[1]\ \ldots\ p_x[K_0-1])^T \quad (23)$$

and Q is an n×n matrix of elements $Q_{xy}$, each of which is a matrix of the form $$Q_{xy} = \begin{bmatrix} q_{xy}[0] & q_{xy}[0-1] & \cdots & q_{xy}[0-K_0+1] \\ q_{xy}[1-0] & q_{xy}[0] & \cdots & q_{xy}[-K_0+2] \\ \vdots & \vdots & \ddots & \vdots \\ q_{xy}[K_0-1] & q_{xy}[K_0-2] & \cdots & q_{xy}[0] \end{bmatrix}. \quad (24)$$

Finally, from equation (22), we can write $$\bar{h}_j = Q^{-1}P. \quad (25)$$

Equation (25) indicates that, in order to compute the channel's impulse response estimates, $Q^{-1}$ must be calculated. While this is a straight forward task, it can be burdensome because the value of $K_0 \times n$ may be relatively large even for small values of n. Fortunately, however, for wireless channels, the h[l]'s of equation (9) for most of values of l are zero or essentially zero, so these taps can be ignored, leading to a situation where many terms of Q are zero (or small enough to be set to zero). This reduces the volume of computation that is associated with computing $Q^{-1}$.

FIG. 1 presents a block diagram of that portion of a receiver that estimates the impulse response of a channel from a transmitter having n antennas, to a receiver having m antennas. Accordingly, FIG. 1 depicts a transmitter having an encoder 110, a plurality of OFDM transmitters 120-i, where i=1, 2, ... n, and a corresponding plurality of transmitting antennas 130-i. A depicted receiver includes m receiving antennas 210-j that are coupled to n OFDM receivers 220-j. The output signals of receivers 220-i are applied to maximum likelihood detector 230 which detects the signals transmitted by antennas 130-i in accordance with whatever approach is appropriate to the encoding process employed in the transmitter. The aforementioned "Diversity Coded OFDM For High Data Rate Communication," patent application discloses one approach.

The detection performed in element 230 employs estimates of the channel impulse responses. Those estimates come from a plurality of m estimation blocks 240, only one of which is shown in FIG. 1. The shown estimation block 240 is responsive to the $b_i(k)$ signals developed by detector 230 and to the signals of OFDM receiver 220-m. The other, not-shown, estimation blocks are each responsive to a different OFDM receiver.

Within block 240, unit 241 develops the various $q_{xy}[l_0]$'s of matrix (24) and equation (15). These values are stored in memory 242 and then applied, as a group, to unit 243 which computes the inverse of matrix Q. Concurrently, unit 244 computes the elements of vector P in accordance with equations (23) and (14), and the computation results of units 244 and 243 are applied to matrix multiplier unit 245. Unit 245 performs the computations of equation (25), yielding the desired channel impulse response estimates that are applied to detector 230.

Figure 2:
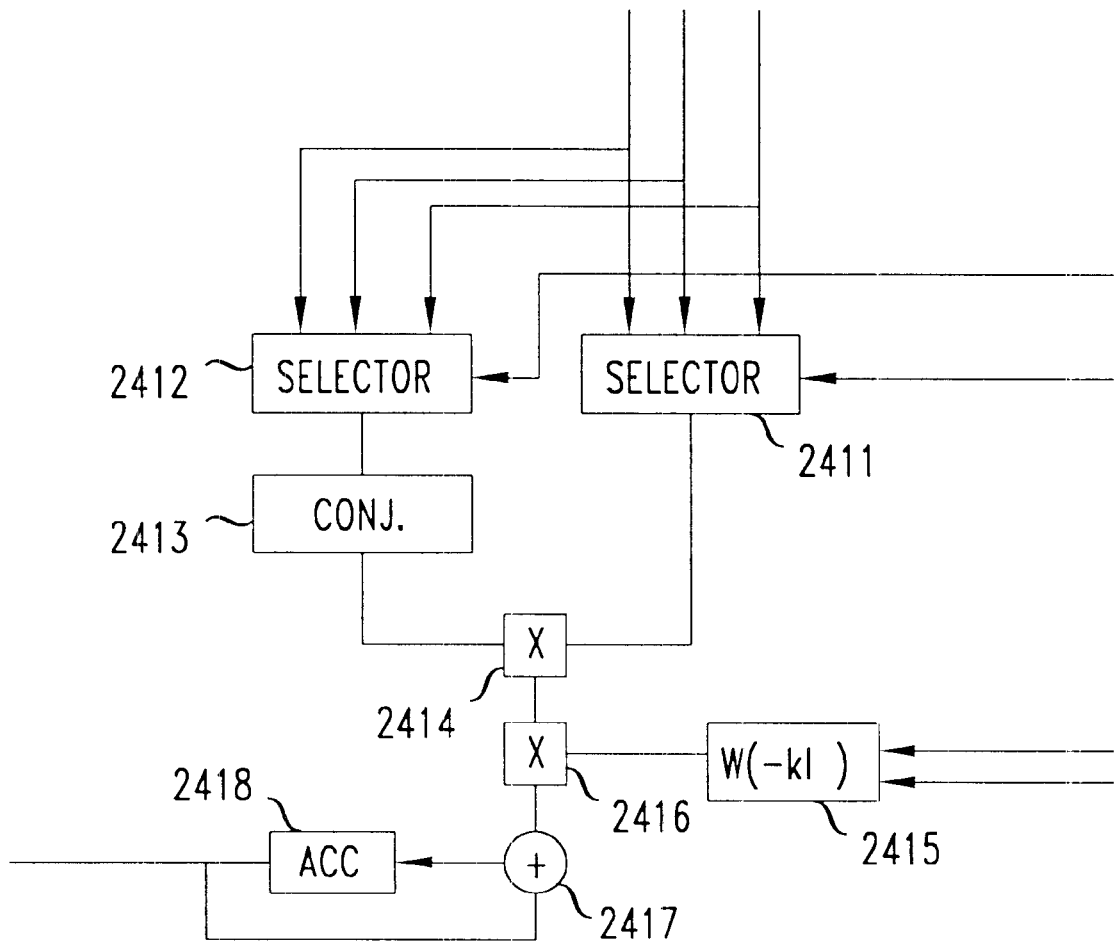
FIG. 2 presents block 240 of FIG. 1 in greater detail.

FIG. 2 presents a more detailed block diagram of unit 241. Selector 2411 receives the detected signals that represent the signals sent by the different transmitting antennas and selects a particular signal under control of controller 250. That forms the signals $b_x[k]$ of equation (15). Selector 2412 selects of the detected signals, also under control of controller 250, and conjugation unit 2413 conjugates the signal, thus forming signal $b_i[k]$ of equation (15). The outputs of units 2411 and 2413 are multiplied in units 2414, and the product is multiplied by factor $W[-kl_0]$, which is obtained from unit 2415. Unit 2415 generates this factor in response to applied signals k, and l, from controller 250. The product signal developed by multiplication unit 2416 is accumulated in register 2418 with the aid of adder 217. By cycling through the k and l indexes, and cycling through the indexes that effect the selection in units 2412 and 2411, all of the needed $q_{xy}[l_0]$ terms that form matrix Q are obtained.

What is claimed is:

1. A receiver that includes a plurality of OFDM receiver modules and a detector that is responsive to output signals of said receiver modules, the improvement comprising:

a module responsive to output signals of said detector and to output signals of said OFDM receiver modules for developing estimats of channel impulse responses from n transmitting antennas of a transmitter to receiving antennas of said plurality of OFDM receiver modules, and applying said estimates of channel impulse responses to said detector, where n>1.

2. The receiver of claim 1 where each of said estimates of chanel impulse response comprises samples that ae fewer in number than K, where K is the number of subbands of said OFDM receiver modules.

3. The receiver of claim 1 where said detector develops n of said output signals.

4. The receiver of claim 1 where said module comprises m submodules, where m is the number of said OFDM rcver modules, and each submodule is responsive to the output signal of one, associated, module of said OFDM receiver modules.

5. The receiver of claim 4 where m>1.

6. The receiver of claim 4 where each submodule develops estimates of channel impulse responses between said n transmitting antennas and the receiving antenna of said associated OFDM reever module.

7. The receiver of claim 4 where each submodule comprises:

a first generator responsive to said output siga of said detector, generating a first set of signals;

a matrix manipulation modules that arranges sad set of signals in a first matrix of signal components, and forms a second matrix of signal components that is a matrix inverse of said first matrix, a second generator, responsive to said output signals of said associated OFDM receiver module, developing a vector of signal elements; and a matix multiplication element that multiplies said second matrix by said vector, to yield a vector of signal elements that represent channel impulse response from said transmitting antennas to the receiving antenna of said associated OFDM receiver module.

8. The receiver of claim 4 where each submodule comprises:

a first generator responsive to said output signals of said deteator; $b_i$, where i=1, 2, ... n, generating a first set of signals corresponding to $$q_{gi}[l_o] = \sum_{k=1}^{K} b_g[k] b_i^*[k] W[-kl_o],$$

where g=1, 2, ... n, and i=1, 2, ... n, k is the subband, and $$W[kl_0] \equiv \exp\left(-j\frac{2\pi kl_0}{K}\right);$$

a matrix manipulation modules that avanges said set of signals an n×n matrix Q of elements $Q_{xy}$, where $Q_{xy}$ $$Q_{xy} = \begin{bmatrix} q_{xy}[0] & q_{xy}[0-1] & \cdots & q_{xy}[0-K_0+1] \\ q_{xy}[1-0] & q_{xy}[0] & \cdots & q_{xy}[-K_0+2] \\ \vdots & \vdots & \ddots & \vdots \\ q_{xy}[K_0-1] & q_{xy}[K_0-2] & \cdots & q_{xy}[0] \end{bmatrix},$$

and forms a $Q^{-1}$ matrix of signal components that is a matrix inverse of said matrix Q;

a second generator, responsive to said output signals of said associated OFDM receiver module, developing a vector P of signal elements $p_x$, where index x=1, 2, ... n, and $$p_x = (p_x[0], p_x[1] \ldots p_x[K_0-1])^T$$

where $K_0$ is an integer corresponding to the number of samples contained in each estimate of said channel impulse responses; and a matrix multiplication element that multiplies said $Q^{-1}$ matrix by said P vector, to yield a vector of signal elements that represent channel impulse response from said transmitting antennas to the receiving antenna of said associated OFDM receiver module.

9. The receiver of claim 1 where said output sigals are information sigals.

* * * * *

UNITED STATES PATENT AND TRADEMARK OFFICE
CERTIFICATE OF CORRECTION

PATENT NO. : 6,473,393 B1
DATED : October 29, 2002
INVENTOR(S) : Ye Li et al.

It is certified that error appears in the above-identified patent and that said Letters Patent is hereby corrected as shown below:

Column 1,
Line 7, "Pe Commuxication" should read -- Rate Communication --

Column 2,
Line 14, "$b_y[k]$" should read -- $b_y^*[k]$ --

Column 3,
Line 20, "$H_0(f) \equiv \int_{-\infty}^{+\infty} h(t)e^{-j2\pi f\tau}dt$" should read -- $H_0(f) \equiv \int_{-\infty}^{+\infty} h_o(t)e^{-j2\pi ft}dt$ --

Line 34, "rmax" should read -- $\tau_{max}$ --
Line 58, "initial are" should read -- initial estimates are --

Column 4,
Line 60, "$\sum_{g=1}^{n} q_{gi}[l_0]\tilde{h}_{gj} = p_i[l_0]$" should read -- $\sum_{g=1}^{n} \mathbf{q}_{gi}[l_0]\tilde{\mathbf{h}}_{gj} = p_i[l_0]$ --

Line 66, "$\tilde{h}_{gj} = (h_{gj}[0], \ h_{gj}[1], \ \cdots \ h_{gj}[K_0-1])^T$" should read
-- $\tilde{\mathbf{h}}_{gj} = (h_{gj}[0], \ h_{gj}[1], \ \cdots \ h_{gj}[K_0-1])^T$ --

Line 67, "$q_{gi}[l_0] = (q_{gi}[l_0-0], q_{gi}[l_0-1], \cdots q_{gi}[l_0-K_0+1])$" should read -- $\mathbf{q}_{gi}[l_0] = (q_{gi}[l_0-0], q_{gi}[l_0-1], \cdots q_{gi}[l_0-K_0+1])$ --

Column 5,
Line 2, "$q_i[l_0]\tilde{h}_j = p_i[l_0]$" should read -- $\mathbf{q}_i[l_0]\tilde{\mathbf{h}}_j = p_i[l_0]$ --

Line 4, "$q_i[l_0] = (q_{1i}[l_0], q_{2i}[l_0], \cdots q_{ni}[l_0])$" should read -- $\mathbf{q}_i[l_0] = (\mathbf{q}_{1i}[l_0], \mathbf{q}_{2i}[l_0], \cdots \mathbf{q}_{ni}[l_0])$ --

Line 5, "$\tilde{h}_j = (\tilde{h}_{1j}, \ \tilde{h}_{1j}, \ \cdots \ \tilde{h}_{1j})$" should read -- $\tilde{\mathbf{h}}_j = (\tilde{\mathbf{h}}_{1j}, \ \tilde{\mathbf{h}}_{1j}, \ \cdots \ \tilde{\mathbf{h}}_{1j})^T$ --

Line 12, "$Q\tilde{h}_j = P$" should read -- $\mathbf{Q}\tilde{\mathbf{h}}_j = \mathbf{P}$ --
Line 14, "where P is a vector of n elements, $p_x$," should read -- where $\mathbf{P}$ is a vector of n elements, $\mathbf{p}_x$ --
Line 15, "$p_x = (p_x[0], \ p_x[1], \ \cdots p_x[K_0-1])^T$" should read
-- $\mathbf{p}_x = (p_x[0], p_x[1], \cdots p_x[K_0-1])^T$ --
Line 19, "Q is an $n$ x $n$ matrix of elements $Q_{xy}$," should read -- $\mathbf{Q}$ is an $n$ x $n$ matrix of elements $\mathbf{Q}_{xy}$, --
Line 22, Eq. (24): "$Q_{xy} =$" should read -- $\mathbf{Q}_{xy} =$ --
Lines 32 and 42, "$Q^{-1}$" should read -- $\mathbf{Q}^{-1}$ --
Line 39, "$Q$" should read -- $\mathbf{Q}$ --

Page 1 of 3

UNITED STATES PATENT AND TRADEMARK OFFICE
CERTIFICATE OF CORRECTION

PATENT NO. : 6,473,393 B1
DATED : October 29, 2002
INVENTOR(S) : Ye Li et al.

It is certified that error appears in the above-identified patent and that said Letters Patent is hereby corrected as shown below:

<u>Column 6,</u>
Line 2, "$Q$" should read -- Q --
Line 3, vector P" should read -- vector P --
Line 13, "$b_x[k]$" should read -- $b_g[k]$ --

Line 16, "$b_i[k]$" should read -- $b_i^*[k]$ --

Line 32, "estimats of" should read -- estimates of --
Line 38, "that ae fewer" should read -- that are fewer --
Line 44, "rever" should read -- receiver --
Line 52, "reever" should read -- receiver --
Line 55, "siga" should read -- signals --
Line 57, "manpulation" should read -- manipulation --
Line 57, "sad" should read -- said --
Line 65, "matix" should read -- matrix --

<u>Column 7,</u>
Line 7, "deteator;" should read -- detector, --
Line 26, "$Q$" should read -- Q --
Line 26, "$Q_{xy}$" should read -- Q$_{xy}$ --
Line 26, second occurrence of "$Q_{xy}$" should be deleted

UNITED STATES PATENT AND TRADEMARK OFFICE
CERTIFICATE OF CORRECTION

PATENT NO.    : 6,473,393 B1
DATED         : October 29, 2002
INVENTOR(S)   : Ye Li et al.

It is certified that error appears in the above-identified patent and that said Letters Patent is hereby corrected as shown below:

<u>Column 8,</u>
Line 1, "$Q_{xy}=$" should read -- $\mathbf{Q}_{xy}=$ --
Line 8, "$Q^{-1}$" should read -- $\mathbf{Q}^{-1}$ --
Line 8, "$Q$" should read -- $\mathbf{Q}$ --
Line 12, "vector P" should read -- vector $\mathbf{P}$ --
Line 12, "$p_x$" should read -- $\mathbf{p}_x$ --
Line 15, "$p_x = (p_x[0], p_x[1], \cdots p_x[K_0 - 1])^T$" should read -- $\mathbf{p}_x = (p_x[0], p_x[1], \cdots p_x[K_0 - 1])^T$ --
Line 17, "estimiate" should read -- estimate --
Line 19, "$Q^{-1}$" should read -- $\mathbf{Q}^{-1}$ --
Line 20, "vector P" should read -- vector $\mathbf{P}$ --
Line 23, "sigals" should read -- signals --
Line 24, "sigals" should read -- signals --

Signed and Sealed this

Twenty-seventh Day of May, 2003

JAMES E. ROGAN
*Director of the United States Patent and Trademark Office*